United States Patent [19]

Prestridge et al.

[11] 4,308,127
[45] Dec. 29, 1981

[54] SEPARATION OF EMULSIONS WITH ELECTRIC FIELD

[75] Inventors: Floyd L. Prestridge, Mounds, Okla.; Ronald L. Longwell, Boise, Id.

[73] Assignee: Combustion Engineering, Inc., Windsor, Conn.

[21] Appl. No.: 230,227

[22] Filed: Feb. 2, 1981

Related U.S. Application Data

[63] Continuation-in-part of Ser. No. 130,878, Mar. 17, 1980.

[51] Int. Cl.³ .................... B01D 17/06; C10G 33/02
[52] U.S. Cl. ................................ 204/302; 204/188
[58] Field of Search ..................... 204/188, 302–308

[56] References Cited

U.S. PATENT DOCUMENTS

| | | | |
|---|---|---|---|
| 1,838,922 | 12/1931 | Fisher | 204/305 |
| 2,364,118 | 12/1944 | Wolfe | 204/188 |
| 2,855,356 | 10/1958 | Stenzel | 204/302 |
| 2,897,251 | 7/1959 | Waterman | 204/305 |
| 3,574,085 | 4/1971 | Woelflin | 204/188 |
| 3,812,027 | 5/1974 | Jarvis | 204/302 |
| 3,847,775 | 11/1974 | Prestridge | 204/191 |
| 4,033,851 | 7/1977 | Oros | 204/302 |
| 4,049,535 | 9/1977 | Winslow, Jr. | 204/305 |
| 4,126,537 | 11/1978 | Prestridge | 204/302 |
| 4,139,441 | 2/1979 | Bose | 204/305 |
| 4,182,672 | 1/1980 | Martin | 204/302 |

*Primary Examiner*—T. M. Tufariello
*Attorney, Agent, or Firm*—Arthur L. Wade

[57] ABSTRACT

A plurality of electrostatic fields is arranged to progressively separate the liquids from their emulsions having a low dielectric strength. The emulsions are first passed through one of the electrostatic fields between insulated electrodes. With the breaking of the emulsion begun by the first electrostatic field, the emulsion is next flowed in an electrostatic field between uninsulated electrodes. The final stage is the passing of the almost completely broken emulsion through an electrostatic field between electrodes which are arranged to systematically degrade their field.

6 Claims, 6 Drawing Figures

SEPARATION OF EMULSIONS WITH ELECTRIC FIELD

This Application is a continuation-in-part of application Ser. No. 130,878 filed Mar. 17, 1980.

TECHNICAL FIELD

This invention relates to the use of multiple-electrostatic fields which differ from each other in breaking highly conductive liquid emulsions. More particularly, the invention relates to progressive reduction of the aqueous component of liquid emulsions by the staged exposure to electrostatic fields which vary from each other in nature and strength.

BACKGROUND ART

One of the attempts to capsule the historical development of using electrostatic fields to resolve liquid emulsions is found in Prestridge U.S. Pat. No. 3,847,775 dated Nov. 12, 1974, incorporated by reference, and hereinafter referred to as the dual polarity disclosure. The dual polarity disclosure was drafted at a time when its assignee was exclusively concerned with the reduction of oil-water emulsions. Nevertheless, the terminology and concepts recognized that the oil-water emulsions were included in the broader definition of the emulsions of polar and non-polar liquids.

With the passage of time, the metallurgical recovery systems utilizing solvent extraction techniques were brought to the attention of the assignee of the dual polarity disclosure. In penetration of this market, the assignee has become concerned with the problem of mixing and separating aqueous phases from the solvent phases which is one of the aspects of these metallurgical recovery systems. Again, the solvent-aqueous emulsion also falls under the classification of an emulsion of polar and non-polar liquids. Therefore, the breaking of both the oil-water emulsions and the solvent-aqueous emulsions presents a common problem. Characteristically, and in common with oil field emulsions, these metallurgical emulsions are low in dielectric strength in proportion to the ratio of the aqueous phase to the solvent phase.

Prestridge U.S. Pat. No. 4,126,537 dated Nov. 21, 1978, is incorporated by reference as a technological footprint of the assignee and is part of the art of forming a degraded electrostatic field between electrodes energized by a source of DC. This disclosure attempts an explanation of the problem of coalescing extremely small drops of an aqueous liquid in an emulsion with a non-polar liquid. Essentially, the disclosure explains how the hydraulic shearing forces of the non-polar liquids are prevented from limiting the progressive coalescence of the aqueous phase.

It became evident in the researching for reduction of the metallurgical emulsions that the reduction of the oil field emulsions could also be effected. A long-standing problem in reducing oil field emulsions has been their variable dielectric strength. At a certain lowered value of dielectric strength of the emulsion, the electrostatic field between the electrodes collapses. A substantial amount of literature has discussed the nature of the conductive path formed between energized electrodes in emulsions having a relatively high proportion of aqueous phase. It is difficult to precisely measure when the increasing quantity of the aqueous phase in the emulsion lowers the dielectric strength of the emulsion to the value where a particular level of energy to the electrodes will fail to sustain an electrostatic field. There has been contemplation of the aqueous phase increasing to the value where it apparently becomes the continuous phase of the emulsion and thereby establishes the undesirable low level of dielectric strength. Some workers refer to this as approaching a 1 to 1 ratio. It is not deemed vital to pinpoint the level of dielectric strength which will preclude the maintenance of the electrostatic field between the electrodes. It has simply been discovered that there is a need for an additional electrical insulator between energized electrodes when creating an electrostatic field through which an emulsion of low dielectric strength is passed.

The dual polarity disclosure contemplated the relatively broad classification of emulsions on each side of the 1% cut of aqueous. The disclosure specifically defines the wet emulsion as being that with more than 1% cut while the dry emulsions are those with less than 1% cut. As emulsions were encountered with a cut of substantially more than 1% aqueous, the problem was consigned to the broad limbo where other means and methods were employed to get the cut down close enough to 1% for treatment by the electrostatic field of the dual polarity disclosure.

Also, the dual polarity disclosure left the vague impression that the dry emulsions in the DC electrostatic field could be treated down to a satisfactory level of aqueous content. The demands of both the oil field and mineral industries are now specifying aqueous contents down to 100 ppm or less. At this point, the degraded field disclosure moves to center stage.

The degraded field disclosure somewhat narrowly focuses upon means and methods for systematically reducing the gradient of an electrostatic field as the emulsion passes through the field. The extremely small aqueous dispersions can be moved by the high intensity of the DC electrostatic field if provisions for degrading that field are made to avoid the hydraulic force which tends to shear the aqueous dispersion as it is coalesced to a predetermined size.

The art is now prepared for a significant leap forward by arranging a series of electrostatic fields, some of which were given birth as evidenced by both the dual polarity disclosure and the degraded field disclosure. This advance in the art can be applied even-handedly to both the emulsion of the oil field and the emulsion of the minerals industry, which are broadly classified as emulsions of polar and non-polar liquids.

DISCLOSURE OF THE INVENTION

The present invention contemplates passing an emulsion of polar and non-polar liquids, having a low dielectric strength, through a first electrostatic field generated by an AC type of electric energy. The dielectric strength between the energized electrodes is maintained high enough to sustain an electrostatic field between the electrodes, regardless of the variations of dielectric strength of the emulsions. That polar liquid coalesced in this first electrostatic field is gravitated from the remaining emulsion. The remaining emulsion next passes through a second electrostatic field, the emulsion now having the dielectric strength to sustain a higher field between the energized electrodes. Contemplating that the emulsion is passed through the electrostatic field leaving its polar liquid component reduced to substantially 1%, the emulsion is then passed through a third electrostatic field sustained by a relatively high intensity DC. The electrodes energized by the DC are arranged to degrade the electrostatic field in the direction the emulsion flows, the coalesced polar liquid being removed to leave an emulsion containing in the order of 100 ppm or less of aqueous/polar material.

Other objects, advantages and features of the invention will become apparent to one skilled in the art upon consideration of the written specification, appended claims and accompanying drawings.

BEST MODE FOR CARRYING OUT THE INVENTION

Introduction

The present invention will be disclosed as embodied in the process and structure whereby both the oil-water emulsions of the oil field and the solvent-aqueous emulsions of the metallurgical industry are reduced. The structure required by each industry will have its own unique configuration. However, it will become apparent that the process carried out in each structure will have common denominators of the invention.

It is now well accepted that the dielectric strength of the emulsions treated depends largely upon the aqueous component of the emulsions. The aqueous phase, or component, is polar and has poor electrical insulating qualities. If the aqueous phase, or water, of the emulsion becomes great enough in the emulsion, the emulsion will have correspondingly less dielectric strength.

It is well established that, at some low value of the dielectric strength, the emulsion having this dielectric strength between energized electrodes will break down, causing collapse of the electrostatic field between the electrodes.

The problem is found in the electrostatic separation of the polar and non-polar liquids of an emulsion in which the quantity of the polar component is so great and the corresponding dielectric strength is so low that the electrostatic field collapses and is ineffective to coalesce the polar liquid. The problem of reducing the emulsion of low dielectric strength is solved by the present invention, utilizing a series of electrostatic fields. If we can agree that the foregoing terminology is adequate, a disclosure of the invention through the embodiments of the drawings can proceed on firm ground.

General Plan for Solvent Extraction Embodiment

The present invention is disclosed as embodied in a system for separating a solvent phase and an aqueous phase which have been mixed into an emulsion for the purpose of ion exchange between the two phases. The emulsion of liquids is received in a cylindrical container in which electrodes are mounted and arranged to generate the electrostatic fields which break, or reduce, the emulsion. To aid an understanding of the chemical arrangement of electrodes and baffles within the container which control the flow and separation of the liquids in the container, three drawing figures are utilized to cumulatively disclose the embodying structure.

Figure 1:
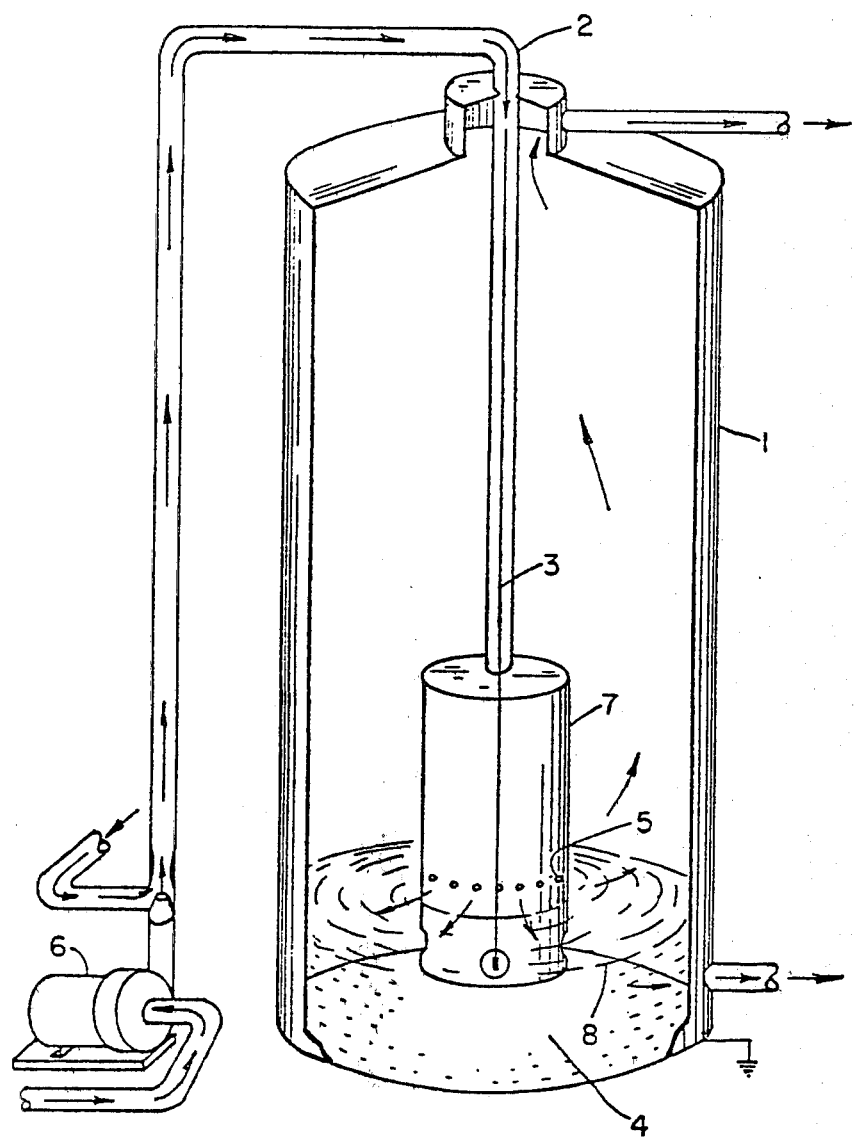
FIG. 1 is a sectioned isometric elevation of a container with structure for mounting the first set of electrodes establishing the first electrostatic field of the series of fields in which the present invention is embodied.
Figure 2:
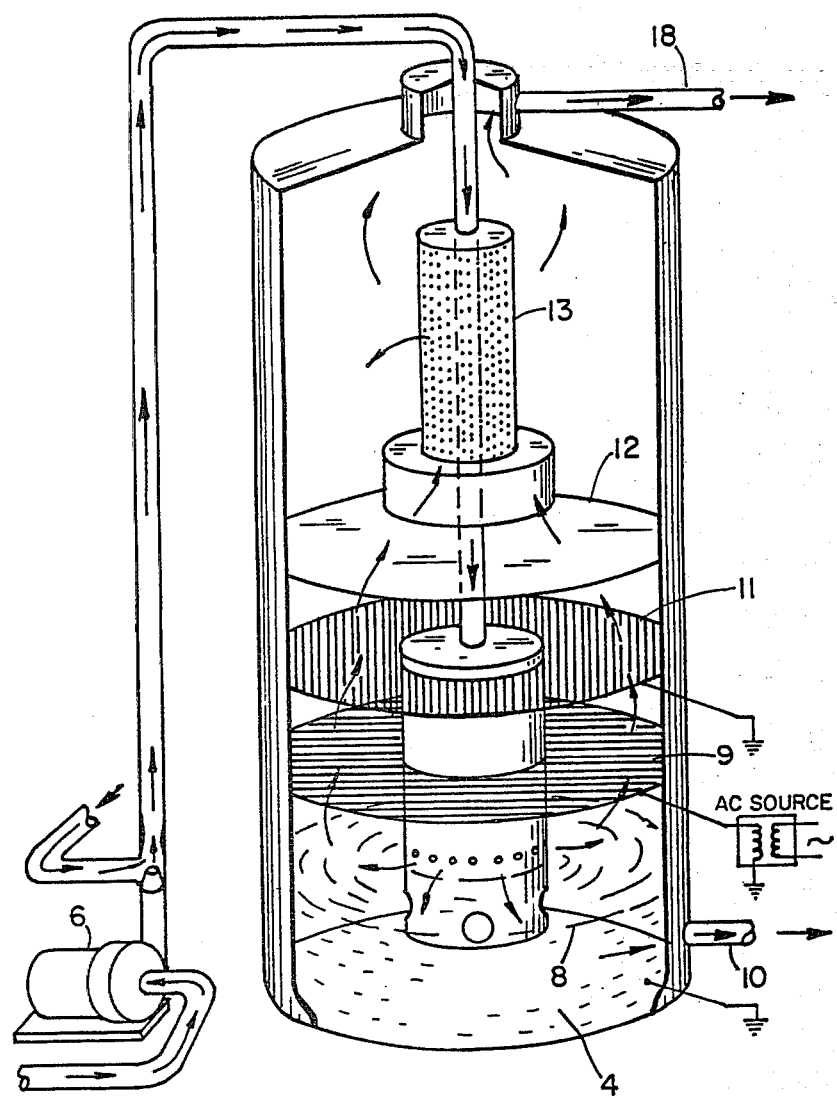
FIG. 2 is similar to FIG. 1 with the structure added to generate the second of the electrostatic fields of the series.
Figure 3:
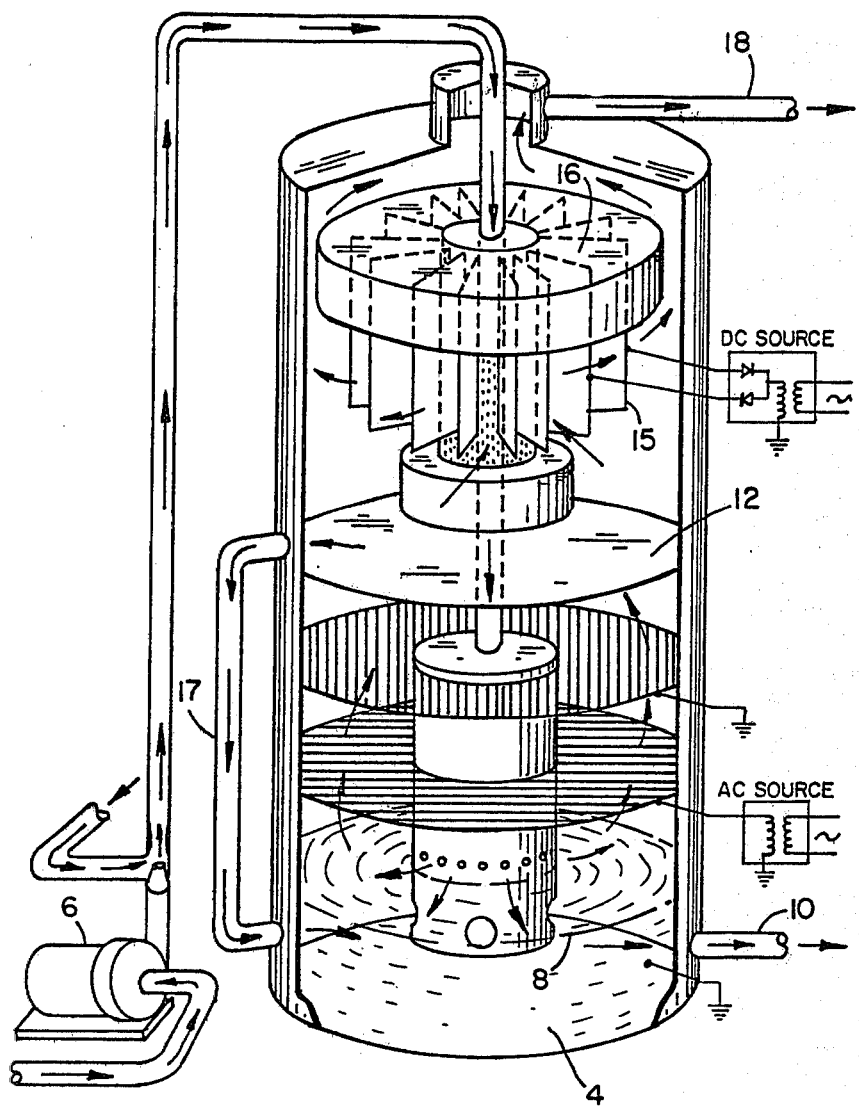
FIG. 3 is similar to FIGS. 1 and 2 and discloses the structure added for generation of the last of the electrostatic fields.

Details of FIGS. 1, 2 and 3

In FIG. 1, cylindrical vessel 1 receives the emulsion through conduit 2. Conduit 2 is formed of electrically insulating material. A ground electrode 3, in the form of a wire, is extended axially the length of conduit 2. Between wire-electrode 3 and energized electrodes (not shown), mounted external the conduit 2, is sustained the first electrostatic field. Therefore, the electrically insulating material supplements the dielectric strength of the emulsion between the electrodes to insure a high enough dielectric strength to sustain the first electrostatic field. Although the emulsion of liquids passing down the conduit 2 has a low dielectric strength, the insulating material of the conduit 2 prevents the emulsion from causing dielectric breakdown and collapse of the electrostatic field between the electrodes. In effect, the electrodes are insulated from each other by the insulating material of conduit 2.

As will be reviewed subsequently, the first set of electrodes is energized by connection to a source of electric power. The resulting first electrostatic field is a type of AC field and has sufficient gradient to begin the coalescing of the polar liquid of the emulsion, as the emulsion flows down conduit 2 to the lower portion of container 1. The coalesced aqueous phase of the emulsion is separated and gravitates out the lower end of conduit 2 to form body 4. The emulsion remaining from the first exposure to the first electrostatic field is distributed horizontally by its flow through openings 5. This is the basic story told by FIG. 1.

There are details of FIG. 1 which should be indicated in passing. The complex system of conduits which terminate in conduit 2 are connected to pump 6. Pump 6 is driven by a source of electrical power. All such details are really not necessary to disclose the present invention. There is a supply of liquid emulsion which comes to container 1 by way of conduit 2. The emulsion begins to reduce under the force of the first electrostatic field as the emulsion descends in conduit 2. The polar-aqueous component of the emulsion coalesced by the first field collects in the bottom of container 1, conduit 2 also functioning as a first path. The lower end of conduit 2 is shown as enlarged into an axially aligned section 7. A warning is posted that one should not allow these details of arrangement and construction to distract the mind from the concept that the first electrostatic field begins reducing the emulsion of low dielectric strength, the aqueous phase broken away ending as body 4 in the lower part of container 1, while that emulsion remaining unreduced is spread outwardly from openings 5 to interface with body 4 at 8. Attention can now be shifted to FIG. 2 for the disclosure of the second electrostatic field generated above interface 8.

FIG. 2 discloses the second set of electrodes 9 and 11 mounted in the lower portion of container 1, the second electrostatic field established by the second set of electrodes continuing the coalescence of the aqueous phase of the remaining emulsion. Interface 8 is controlled well below electrically energized electrode 9. It is not necessary to illustrate the control system on the drawings. It is common practice to provide a level control system which regulates the discharge of the aqueous phase from body 4 through conduit 10.

There are several specific forms and supports for the second set of electrodes 9 and 11 of FIG. 2. There is little to be gained by an exhaustive disclosure of any one of the possible electrode forms in FIG. 2. It is expected to energize the second set of electrodes from an AC power supply and the character and function of this second electrostatic field is well-known in the prior art. It is pointed out that the emulsion distributed from openings 5 will pass upwardly through this second electrostatic field, reduced in its polar content so that it will have sufficient dielectric strength to sustain this second electrostatic field. One portion of the field will extend downward from the energized electrode 9 to interface 8 while the second portion of the field is sustained between the energized electrode 9 and the upper ground electrode 11.

The aqueous component of the emulsion is expected to be greatly reduced toward 1% by the first field. This second electrostatic field is expected to reduce the "cut" toward 1% and below. That aqueous coalesced by the second field will gravitate downwardly within container 1, this second path for the coalesced aqueous terminating in the body 4. That portion of the emulsion remaining not reduced will flow upward in container 1 and be guided by baffle 12.

Baffle 12 is shaped and arranged to terminate in a distributing cylinder 13. The emulsion is next flowed radially outward through openings in cylinder 13 to enter the third electrostatic field which will be disclosed in FIG. 3.

We have now arrived by simple stages at a disclosure of the third set of electrodes 15. The third electrostatic field sustained between these electrodes 15 has the almost completely reduced emulsion distributed through it.

The electrodes 15, connected to a DC power source, are disclosed in FIG. 3 as flat plates vertically extended and radiating outwardly from the axis of container 1. The space 16 between the electrodes forms a series of wedge-shaped paths for the emulsion discharged from the openings of cylinder 13. These energized electrodes, having a source of DC power applied to them, generate a gradient between them and the ground wire electrodes 3 to form a type of AC action which makes up the first field disclosed in FIG. 1. This type of field is quite similar to the AC type of field disclosed in the dual polarity patent incorporated by reference. The intensity and arrangement of this field are effective in initiating reduction of the incoming emulsion. The DC field sustained between electrode plates 15 acts in accordance with the disclosure of the degraded field disclosure which is incorporated herein by reference. The result is the nurtured coalescence of the extremely small, dispersed droplets of aqueous remaining in the emulsion. The degraded field produces a coalesced aqueous droplet of the size which will gravitate downwardly. The coalesced and quantitative drops of aqueous accumulate on the upper surface of baffle 12 and are flowed into body 4 by conduit 17. The non-polar fluid, now effectively separated from the polar fluid, flows from container 1 through conduit 18.

Prologue to Oil Field Treater Embodiment

Study of the structure of FIGS. 1-3 in perspective concludes that this cylindrical vessel might well function as an effective production unit for oil field emulsions. It is reasonable to expect that oil field emulsions pumped through conduit 2 would be reduced into oil and water, the water being discharged through conduit 10 and the oil discharged through conduit 18. For comparatively small quantities of oil field emulsions, this form of "treater" vessel might be practical. Many a wash tank has received oil field emulsions, the tanks being of the configuration of vessel 1. Arranging electrodes as disclosed in container 1 would logically produce respectable quantities of treated oil from conduit 18. The temperature of oil field emulsions processed by this system might well be achieved by heating equipment in conduit 2 upstream of vessel 1. However, it has been long established that the horizontal extension of cylindrical vessels is preferable for the oil field treater. The horizontal vessel is more accessible to the operating personnel. Maintenance, repairs and replacement of equipment on the horizontal vessel is more convenient than on the vertical vessel. Several considerations have established the tradition of the horizontal vessel for oil field treating.

The present invention can be embodied in the horizontal vessel. It is difficult to justify classifying the solvent-aqueous demulsifier as the preferred embodiment of the invention over the embodiment of the invention of the horizontal oil-water treater. Both embodiments are disclosed as containing essential elements of the invention.

In the horizontal vessel configuration, the insulator between the first set of electrodes is given an entirely different form than the single conduit 2 of FIGS. 1-3. Nevertheless, the function of the insulator as a means for supplementing the dielectric strength of the emulsion between the electrodes is the same in both embodiments. The electrode system in the horizontal vessel establishes the plurality of electrostatic fields claimed despite their different physical arrangement relative to each other and to the emulsion passed sequentially through the electrostatic fields. The same results are obtained by similar structure.

Figure 4:
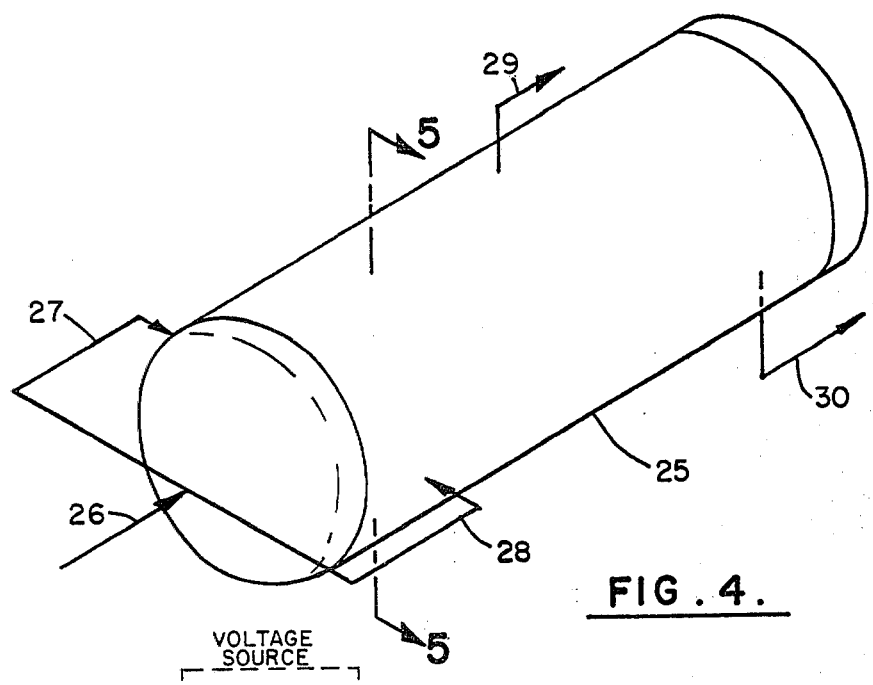
FIG. 4 is an isometric of a horizontal vessel in which structure embodying the present invention processes oil field emulsion.
Figure 5:
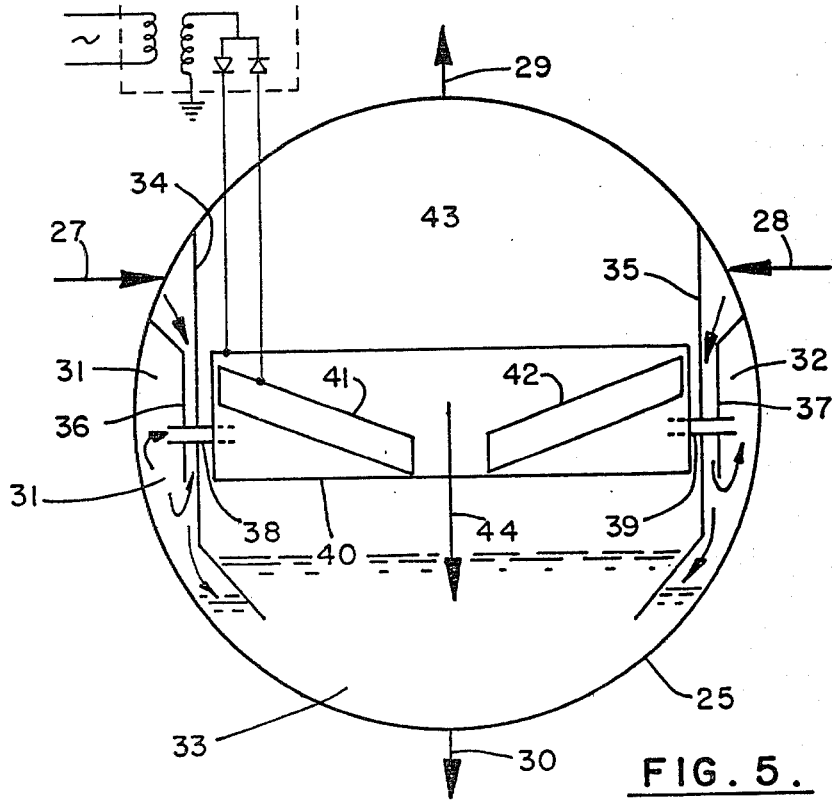
FIG. 5 is a sectioned elevation along lines 5—5 of FIG. 4.
Figure 6:
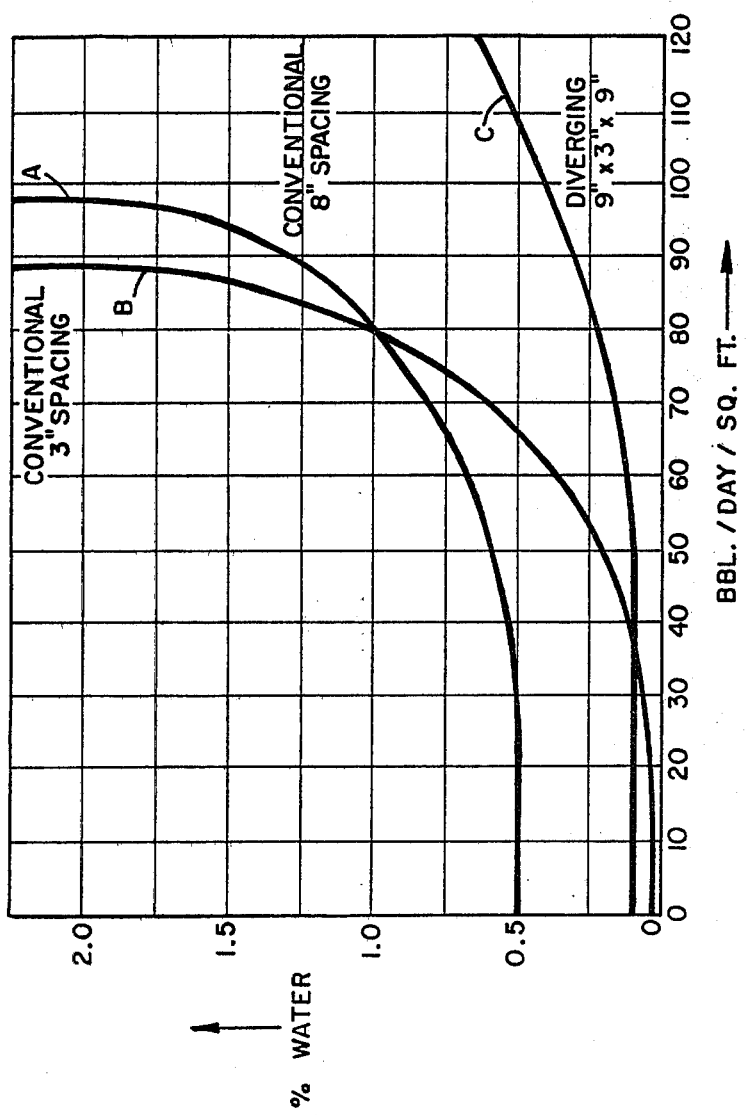
FIG. 6 is a graph indicating the performance of the structure embodying the invention.

Details of FIGS. 4, 5 and 6

FIG. 4 depicts the overall configuration of an oil field treater in the form of a horizontally extended vessel. This vessel 25 is supported on a stable and sound foundation which need not be described in detail. Nor is it necessary to depict the system which brings an emulsion of oil and water to the vessel 25. There is an inlet conduit 26 in which flows an emulsion of oil and water which has the component of water so great as to produce a low dielectric strength. This supply of emulsion is divided evenly and flowed into vessel 25 through branch conduits 27 and 28. Within vessel 25 this emulsion is reduced, the oil flowing from the vessel through conduit 29 and the water flowing from the vessel through conduit 30. For some purposes this is an over simplification of the conduits connected into or from the interior of vessel 25. In further simplicity, it is assumed that there is no significant amount of gas to be accounted for. This explanation gets us into the interior of the vessel 25 with the emulsion which is to be reduced by the structure embodying the present invention.

An electrode structure is internally extended the horizontal length of vessel 25. Any heating and degassing means that may be required for this emulsion is provided by apparatus upstream before entry into vessel 25, and is not a part of this disclosure. The invention is embodied in the electrode arrangement and baffling which embody the same invention as disclosed in FIGS. 1, 2 and 3.

Several approaches to disclosing the electrode and baffle structure embodying the invention in vessel 25 have been considered. On first appearance, a cross-section of vessel 25 seems adequate to show both the electrodes and the fluid flow controlling baffles which give a firm grasp of the concepts. FIG. 5 is that cross-section.

In FIG. 5, branch conduits 27 and 28 deliver their equal shares of the incoming emulsion to the horizontal spreader compartments 31 and 32. Essentially, spreader compartments 31 and 32 are horizontal conduits, each extending substantially the horizontal length of vessel 25. The incoming emulsion delivered to these conduits flows horizontally and is distributed with substantial uniformity along the entire lengths of compartments 31 and 32. It is within these compartments 31 and 32 that the emulsion of low dielectric strength is passed through the first electrostatic field to begin the coalescence of the water-aqueous phase of the emulsion. As each of the compartments 31 and 32 is open-bottomed, that water coalesced by the first electrostatic field finds a first path to the lower portion of the vessel where it forms body 33.

The compartments 31 and 32 are formed by insulator housings 34 and 35. That part of the electrostatic field sustained in these compartments is generated by electrically energized electrodes external the compartments and grounded electrodes 36 and 37 mounted within the compartments. The grounded electrodes 36 and 37 are in the form of plates which are horizontally extended the length of their respective compartments. These grounded plate electrodes are mounted to extend parallel to the vertical sides of the insulator housings to provide a flow space which lies within a part of the first electrostatic field. The coalesced water continues to gravitate downward toward the bottom of the vessel and the emulsion flows from the flow space around the lower edge of the ground electrodes and upward to horizontal conduits 38 and 39 through which it exits the compartments.

The electrical insulators 34 and 35, placed between grounded electrodes 36 and 37 and the energized electrodes to be subsequently disclosed, function to maintain the dielectric strength required to sustain the first electrostatic field through which the emulsion of low dielectric strength is passed. Thus, these insulators, despite their form and location within vessel 25, are comparable to insulator conduit 2 of FIGS. 1–3. The emulsion, although of low dielectric strength due to its large component of water, obviates the collapse of the first electrostatic field. The electrostatic field, so sustained, coalesces an effectively large amount of the water of the emulsion and leaves an emulsion which then flows upward around the lower edge of the plates 36 and 37 and through conduits 38 and 39.

Conduits 38 and 39 mechanically extend through plate electrodes 36 and 37 and insulator housings 34 and 35. Therefore, the emulsion, whose reduction had completed its first stage in compartments 31 and 32, flows from those compartments toward the axis of vessel 25. This brings the reduction of the emulsion to its second stage by flowing it into the second electrostatic field sustained between electrode pairs 40.

At this point, it should be clear that, possibly, grounded electrodes 36 and 37 may not be required to form the effective first electrostatic field within compartments 31 and 32. True, the grounded electrodes may function electrically to form the electrostatic fields, as well as form well-defined flow paths with the internal walls of the insulator housings 34 and 35. On the other hand, the dimensions of the compartments may be set to effectively apply the electrostatic fields to the emulsion flowing into the compartments. Rather than the grounded electrodes, the grounded metallic wall of the vessel may function effectively to establish the electrostatic field between the edges of electrodes 40 and the vessel wall.

It may be desirable to continue forming a flow path within the compartment by a baffle similar to the grounded electrode. But, it is a clear teaching of this application that the first electrostatic field is not restricted to formation between a grounded electrode within the compartment and the electrode edges outside the compartment. Rather, the concept includes the formation of the first electrostatic field between the electrodes 40 edges and the vessel wall within the compartment.

These electrode pairs 40 are horizontally spaced from each other and electrically energized to a level which will sustain an electrostatic field somewhat more intense than the first electrostatic field effective in compartments 31 and 32. The first electrostatic field is sustained between the vertical edges of these plates 40 and the grounded electrodes 36 and 37. The first electrostatic field, sustained between the edges of electrode plates 40 and the grounded electrode plates, is comparable to the first field of FIGS. 1–3. The second field then becomes that sustained between the plate pairs 40, into which the emulsion is next discharged through conduits 36 and 37. The water coalesced from the emulsion in this second field gravitates downward along a second path which delivers the coalesced water to body 33. That portion of the emulsion remaining between plate pairs 40 next flows upward along a third path and enters the third electrostatic field.

The third electrostatic field is sustained between electrodes which are mounted above the second electrostatic field which is sustained between electrode pairs 40. The third electrostatic field is sustained by electrode plates mounted between electrode pairs 40. These electrode plates 41-42 are mounted between electrode pairs 40 and above the second electrostatic field. In effect, the plates 41-42, mounted as they are, are spaced from each other and plate pairs 40 at a distance which sustains a third field much more intense than the lower second electrostatic field between plate pairs 40. The emulsion flows upward along the third path and enters the third field between these electrode plates 40, 41 and 42 and continues upward. As the emulsion flows upward, it leaves the spaces between electrode plates 40, 41 and 42 to flow to a space between electrode pairs 40 above plates 41-42 where the electrostatic field strength is less than between the plates 40, 41 and 42. The result is a degradation of the third field in the direction of emulsion flow. This degraded field is, of course, comparable to the third electrostatic field of FIGS. 1, 2, 3 sustained between electrodes 15.

The shape and extent of electrodes 41,42 can be observed most advantageously in FIG. 5. These plate electrodes can be described as strips extended at an angle to the vertical. Further, these strips are inclined downward toward the horizontal axis of the vessel, leaving a passage between their lower ends. The emulsion flowing from the second electrostatic field into the third electrostatic field continues the staged coalescence of the water droplets which are finally dispersed in the oil, and these carefully nurtured water droplets reach a size which will gravitate them downward along the path 44 between the lower ends of the electrodes 41-42. A remaining oil phase of the emulsion, now finally reduced to a satisfactory level of water content, continues its upward flow path in the upper portion 43 of vessel 25 and exits through conduit 29. The last coalesced water droplets gravitating down through fourth path 44 reach the lower collection of body 33 in the lower portion of the vessel and are removed through conduit 30 with the water coalesced and gravitated by the first and second fields.

Comparison of the Two Embodiments

There is a degree of virtue in restating the similarities between the embodiment of FIGS. 1-3 and that of FIGS. 4-5. The conceived invention is embodied in both structures and the process carried out in those structures. It is difficult to select which of the two structures better illustrates the invention.

Both structures establish three electrostatic fields. The fields increase in strength as the emulsion is passed sequentially through the fields. The first field is designed to be sustained despite the low dielectric strength of the emulsion introduced between the electrodes. To supplement the low dielectric strength of the initial emulsion, an insulating body is placed between the electrodes. Further analysis may pin down just how much coalescence of the polar phase of the emulsion takes place in the first electrostatic field. It is not necessary at this time to make a close analysis of this efficiency. The actual reduction to practice of the invention gives convincing evidence of satisfactory coalescence and removal of the polar phase to the extent that the resulting dielectric strength of the remaining emulsion will not cause collapse of the second electrostatic field.

There are variations in forms of electrodes for the second electrostatic field. The prior art discloses permissible variations, all being effective to further reduce the emulsion by coalescing the polar phase of the emulsion. It would serve no purpose to dwell on these variations. It is sufficient to point out that once the first field has reduced the emulsion so that its dielectric strength will sustain the second electrostatic field between uninsulated electrodes, further coalescence will reduce the "cut" to 1% or below. In all events, this second field is the "work horse" of the fields, preparing the emulsion for the polishing by the third field.

The second field in the FIGS. 1-3 embodiment is established in the lower part of the vertical vessel. The emulsion is distributed radially from the axially located downcomer. The coalesced polar phase gravitates downward and the remaining emulsion flows upward toward the third, polishing field.

In the embodiment of FIGS. 4-5, the second field is sustained between the energized first set of flat plate electrodes centrally mounted along the axis of the horizontal vessel. While the first field is sustained between the edges of these plates and the grounded plates within the compartments, the second field receives the emulsion flowing from the compartments. The emulsion flows from the compartments and into the passages between the first set of electrodes, the coalesced polar phase gravitated downward to the bottom of the vessel and the unreduced emulsion flowing upward toward the third field.

The third field in each embodiment is sustained with electrodes formed and arranged quite differently from each other. However, each third field receives the emulsion flowing from their second fields with high intensity, followed by a degradation of that intensity along the line of emulsion flow. Therefore, the extremely small size drops of polar liquid are coalesced and that process of coalescence is nurtured so that the increasing size of the coalesced polar liquid will not be limited by the hydraulic sheer forces of the non-polar liquid in which the polar liquid drops are dispersed.

In the embodiment of FIGS. 1-3, emulsion flowing from the second field is passed between the electrodes of the third field which diverge from each other to deintensify their electrostatic field. In the embodiment of FIGS. 4-5, the high intensity of the third field is achieved by placing the second set of plate electrodes between the plate electrodes of the first set. This close spacing between the two sets of electrodes sustains the initial high intensity of the third field. The emulsion then flows upward toward the spacing provided by the second set of electrodes, in effect reducing the intensity of the third field. The result in polishing the emulsion of each embodiment is the same. The influence of the technological construction of the embodiment dictates the mechanical variation between the structures of each embodiment, but the concept of the invention is the same in each embodiment.

FIG. 6 Performance

The disclosure of this application is not based upon the purely mental processes of the minds of the inventors. The concepts have been actually embodied in test structures within the laboratory. These laboratory models have encouraged the assignee of the application to invest significant funds in full-scale equipment, which includes the invention. Meanwhile, the lab models have been used to process emulsions at practical throughput rates.

A sheaf of data has been accumulated from the laboratory tests. From these extensive tests has been plucked a group of statistics which the inventors are confident illustrate, without question, the superiority of the embodying structure over the prior art.

FIG. 6 is offered as a graphical representation of actual data accumulated by the inventors. The data relates to the embodiment of the invention in which oil and water are processed as an emulsion including approximately 12% water. The abscissa of the graph is scaled in terms of the percentage of water remaining in the emulsion after the emulsion has been flowed through apparatus embodying the present invention and structure representing comparative prior art practice. The ordinate of the graph is in terms of throughput of the emulsion in units of barrels per day per square foot of electrode area. As the throughput rate of the emulsion increases, the graph demonstrates that there are significant variations of performance between the structures in producing the final product of oil, separated from water with which it was emulsified.

To represent the prior art, the vessel of FIGS. 4 and 5 had pairs of vertical plates 40 spaced 8" apart. The emulsion passed through the electrostatic fields of these electrodes, lowering the final cut of the emulsion to that value traced by Plot A.

The pairs of plate electrodes were then spaced at 3". Plot B illustrates the extremely small cut at low flows which ascends through 2%. Significantly enough, the greater intensity of the electrostatic field sustained between the 3" spacing of the electrodes became less effective than the 8" spacing prior to reaching the 2% cut output.

Plot C illustrates the dramatic improvement obtained when the present invention was embodied in the structure disclosed in FIGS. 4 and 5. Throughout the full range of throughput, the output cut never rises substantially above 0.5%.

Other data selections are available to demonstrate the improvement obtained by the present invention. However, the measurement of the final "cut" of the nonpolar liquid is impressive enough. The detailed explanations of why various spacing of the electrodes sustain the second electrostatic field would form an interesting discussion. It did not appear important in disclosing the present invention. These plots A and B serve the purpose of demonstrating how the prior art cannot obtain the final result possible with the present invention. Precisely why this failure of the prior art need not be recorded. It is sufficient to point out that plot C represents the actual data of reduction to practice of the present invention and the improvement is dramatic and impressive.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A system for reducing the aqueous phase of a liquid emulsion having a low dielectric strength, including,
   a cylindrical vessel with its axis vertically extended,
   a conduit of electrically insulating material extended downward into the vessel and along the length of its vertically extended axis, P1 a grounded electrode in the form of a wire mounted to extend along the axis and within the conduit,
   means for supplying an emulsion having a low dielectric strength to the conduit and flowing the emulsion downward through the conduit,
   a first opening in the lower portion of the conduit for flowing the coalesced aqueous phase into the lower portion of the vessel to form a body of the aqueous phase,
   second openings in the lower portion of the conduit positioned to discharge that emulsion not reduced during the flow through the conduit,
   means for establishing an electrostatic field in the lower portion of the vessel through which the emulsion from the conduit is distributed,
   a path extended downward from the electrostatic field in the lower portion of the vessel to flow the aqueous phase coalesced from the emulsion by the electrostatic field to the lower portion of the vessel,
   a conduit connected to and extended above the electrostatic field in the lower part of the vessel for flowing that emulsion remaining unreduced to the upper portion of the vessel and distributing the emulsion radially from the axis of the vessel,
   means for establishing a first electrostatic field of the AC type with the wire electrode in the conduit and a degraded DC field radially outward from the conduit in which the emulsion flows from the upwardly extended path,
   a path for the aqueous phase coalesced in the degraded field to flow the aqueous phase coalesced by the degraded field to the lower portion of the vessel,
   and a conduit connected to the degraded electrostatic field and extended upward to remove the liquids remaining in the emulsion flowed through the degraded field.

2. A system for reducing the water phase of an oil field emulsion with a low dielectric strength, including,
   a treater vessel of cylindrical configuration extended horizontally,
   an inlet conduit system arranged to supply an emulsion of low dielectric strength to the treater vessel,
   a compartment extended substantially the length of the vessel connected to the conduit to receive the supply of emulsion and formed by a housing of insulating material attached by its upper edge to the internal wall of the vessel to have an open bottom,
   passageways mounted through the wall of the compartment housing so as to form paths for unreduced emulsion toward the axis of the vessel for the unreduced emulsion flowing from the compartment,
   a first set of electrodes in the form of vertical flat plates mounted transverse the axis of the vessel and extending their vertical edges toward the compartment to sustain an electrostatic field between the edges and the grounded wall of the vessel and form flow paths between the plates for receiving the emulsion from the housing passageways,
   a second series of electrodes in the form of vertical flat plates mounted between and parallel the plates of the first set to sustain an electrostatic field of higher intensity than that field sustained by the first set of flat plates and receive the unreduced emulsion from between the first set of flat plates to expose the emulsion to this last field and the field of degraded strength above,
   a passage means for water coalesced and gravitated from the degraded field to a collection in the bottom of the vessel,
   an outlet conduit connected to the upper portion of the vessel for removing the oil,
   and a conduit connected to the lower portion of the vessel for removing water from the collection.

3. A system for reducing the water phase of an oil field emulsion with a low dielectric strength, including,
   a treater vessel of cylindrical configuration extended horizontally, an inlet conduit system arranged to supply an emulsion of low dielectric strength to the treater vessel, a compartment extended substantially the length of the vessel connected to the conduit to receive the supply of emulsion and formed by a housing of insulating material attached by its upper edge to the internal wall of the vessel to have an open bottom, a grounded electrode in the form of a flat plate mounted in the compartment to form a passage with that side of the compartment toward the axis of the vessel so as to receive the emulsion flowed into the compartment and directed downward through the passage, a series of conduits mounted along the length of the compartment and arranged to penetrate the grounded plate and housing side so as to form paths for unreduced emulsion toward the axis of the vessel for the unreduced emulsion flowing from the passageway, a first set of electrodes in the form of vertical flat plates mounted transverse the axis of the vessel and extending their vertical edges toward the grounded plates in the compartment to sustain an electrostatic field between the edges and the grounded plate and form passages between the plates for receiving the emulsion from the conduit paths, a second series of electrodes in the form of vertical flat plates mounted between and parallel the plates of the first set to sustain an electrostatic field of higher intensity than that field sustained by the first set of flat plates and receive the unreduced emulsion from between the first set of flat plates to expose the emulsion to this last field and the field of degraded strength above, a passage means for water coalesced and gravitated from the degraded field to a collection in the bottom of the vessel, an outlet conduit connected to the upper portion of the vessel for removing the oil, and a conduit connected to the lower portion of the vessel for removing water from the collection.

4. The system of claim 3, in which, the electrostatic field sustained between the grounded plate within the compartment and the vertical edges of the first set of vertical flat plates is generated by a source of electrical energy which produces an AC component in the compartment.

5. The system of claim 3, in which, the second set of vertical flat plates is in the form of strips extending between the first set of flat plates and downward toward the axis of the vessel in providing the passage means for the coalesced water from the degraded field.

6. The system of claim 3, in which, a horizontal compartment is mounted within the vessel on each side of the vessel to receive the evenly divided emulsion input to the vessel and flow the emulsion from each compartment toward the axis of the vessel in passing through the electrostatic fields.

* * * * *